(12) United States Patent
Park

(10) Patent No.: US 11,554,974 B2
(45) Date of Patent: Jan. 17, 2023

(54) MEMBRANE SEPARATION PRETREATMENT APPARATUS INCLUDING UNDERWATER PLASMA DISCHARGE UNIT

(71) Applicant: DOOSAN ENERBILITY CO., LTD, Changwon (KR)

(72) Inventor: Yong Hae Park, Busan (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/318,987

(22) Filed: May 12, 2021

(65) Prior Publication Data

US 2021/0395124 A1 Dec. 23, 2021

(30) Foreign Application Priority Data

Jun. 23, 2020 (KR) .................. 10-2020-0076233

(51) Int. Cl.
 B01D 61/14 (2006.01)
 B01D 61/16 (2006.01)
 (Continued)

(52) U.S. Cl.
 CPC .............. *C02F 9/00* (2013.01); *B01D 61/145* (2013.01); *B01D 61/16* (2013.01); *B01D 65/02* (2013.01); *B01D 2311/04* (2013.01); *B01D 2311/06* (2013.01); *B01D 2311/2603* (2013.01); *B01D 2311/2642* (2013.01); *B01D 2311/2692* (2013.01); *B01D 2321/04* (2013.01); *B01D 2321/10* (2013.01); *B01D 2321/12* (2013.01); *C02F 1/30* (2013.01); *C02F 1/444* (2013.01);
 (Continued)

(58) Field of Classification Search
 CPC ... B01D 61/16; C02F 1/4608; C02F 2305/023
 See application file for complete search history.

(56) References Cited

U.S. PATENT DOCUMENTS 6,325,916 B1 * 12/2001 Lambert ............. C02F 1/46114
205/756
2018/0015422 A1 1/2018 Taura
(Continued)

FOREIGN PATENT DOCUMENTS

JP 5362934 B2 12/2013
KR 100496348 B1 6/2005
(Continued)

OTHER PUBLICATIONS

KR OA dated Jan. 28, 2022.
(Continued)

*Primary Examiner* — Bradley R Spies
(74) *Attorney, Agent, or Firm* — Harvest IP Law LLP

(57) ABSTRACT

A membrane separation pretreatment apparatus including a membrane separation unit and a first underwater plasma discharge unit disposed in front of the membrane separation unit is provided. The membrane separation pretreatment apparatus includes a membrane separation unit configured to remove particulate matter contained in raw water, and a first underwater plasma discharge unit disposed in front of the membrane separation unit and configured to cause a portion of the raw water to be introduced into the membrane separation unit to perform underwater plasma discharging.

16 Claims, 16 Drawing Sheets

(51) Int. Cl.
　　　*B01D 65/02*　　(2006.01)
　　　*C02F 1/44*　　(2006.01)
　　　*C02F 9/00*　　(2006.01)
　　　*C02F 1/30*　　(2006.01)
　　　*C02F 1/52*　　(2006.01)

(52) U.S. Cl.
　　　CPC ........ *C02F 1/5245* (2013.01); *C02F 2303/04* (2013.01); *C02F 2303/16* (2013.01); *C02F 2303/20* (2013.01); *C02F 2305/023* (2013.01)

(56) References Cited

U.S. PATENT DOCUMENTS

2019/0016612 A1* 1/2019 Park .................... C02F 1/4608
2019/0031539 A1* 1/2019 Naito .................. C02F 1/4608

FOREIGN PATENT DOCUMENTS

| KR | 100842435 B1 | 7/2008 |
| KR | 101933894 B1 | 4/2019 |
| KR | 102044024 B1 | 6/2019 |
| KR | 101977787 B1 | 8/2019 |
| KR | 20190127645 A | 11/2019 |

OTHER PUBLICATIONS

NPL_Britannica. Water supply system.
Influence of the On-time on the Ozone Production in Pulsed Dielectric Barrier Discharges.
Waterworks Facility Standards.
KR Office Action, dated Jul. 4, 2022.

* cited by examiner

50

50

MEMBRANE SEPARATION PRETREATMENT APPARATUS INCLUDING UNDERWATER PLASMA DISCHARGE UNIT

CROSS REFERENCE TO RELATED APPLICATION

This application claims priority to Korean Patent Application No. 10-2020-0076233, filed on Jun. 23, 2020, the disclosure of which is incorporated herein by reference in its entirety.

BACKGROUND

1. Field

Apparatuses and methods consistent with exemplary embodiments relate to a membrane separation pretreatment apparatus including a plasma underwater electrical discharging device and, more particularly, to a membrane separation pretreatment apparatus using a filter capable of improving filtration performance and durability of the filter by generating a plasma underwater electrical discharge in front of the filter.

2. Description of the Related Art

A water treatment apparatus refers to a device that purifies raw water such as household sewage, agricultural and livestock wastewater, and industrial wastewater generated in the process of human activities, or a device that generates water that can be used in daily life or industrial sites through desalination of seawater.

In large-scale water treatment fields such as water purification, seawater desalination, and wastewater treatment, a filtration unit is provided to primarily filter out impurities contained in raw water. An ultrafiltration (UF) filter, a dual media filtration (DMF) filter, or the like is used as filtration unit. These filters have a large number of fine pores. Thus, when raw water passes through the filter, the raw water is pretreated by filtering out impurities larger than the fine pores.

Because such a filtration unit is configured to filter out impurities such as suspended solids, when the concentration of impurities in raw water such as wastewater or sewage is high, the impurities adhere to the filter, resulting in clogging of the pores of the filter. This deteriorates water purification efficiency of a water treatment apparatus. In particular, the performance of the filter is deteriorated and the service life of the filter is reduced.

Therefore, in order to remove impurities stuck in the filtration unit and improve the performance of the filtration unit, it is required to periodically perform a backwashing operation by periodically opening a drain valve or by passing clean water through the filter unit in the reverse direction.

However, as the usage period of the filter is prolonged, many problems occur. For example, the cycle of backwashing decreases, and only a portion of the filter unit is washed through the backwashing operation, and some impurities remain on the surface of the filter. That is, the efficiency of the backwashing operation and the performance of the filter significantly decrease.

In addition, even though the backwashing operation is periodically performed to remove impurities remaining in the pores of the filter, impurities are continuously accumulated in a region in which impurities are already stuck. This increases a hydraulic pressure difference between a clean region in which no impurities are present and a contaminated region in which impurities are stuck and accumulated, resulting in a filter member breaking.

Accordingly, there is a need for a new pretreatment technology capable of improving filtration efficiency and backwashing efficiency of a filter unit and increasing the service life of the filter unit.

SUMMARY

Aspects of one or more exemplary embodiments provide a membrane separation pretreatment apparatus including a plasma underwater discharge device capable of improving filtration performance and durability of a filter by generating a plasma underwater discharge in front of the filter.

Additional aspects will be apparent in part in the description which follows and, in part, will become apparent from the description from the following description, or may be learned by practice of the exemplary embodiments.

According to an aspect of an exemplary embodiment, there is provided a membrane separation pretreatment apparatus including: a membrane separation unit configured to remove particulate matter contained in raw water and a first underwater plasma discharge unit provided in front of the membrane separation unit and configured to cause a portion of the raw water to be introduced into the membrane separation unit to perform underwater plasma discharging.

The membrane separation unit may include at least one filter selected from among an ultrafiltration (UF) filter and a dual media filtration (DMF) filter.

The first underwater plasma discharge unit may include: a reactor including an input port through which feed water flows in and an output port through which purified water flows out; a ground electrode disposed in a first side of the reactor; and a plasma electrode module disposed in a second side of the reactor and configured to generate plasma.

Electric power in a form of pulsed waves may be supplied to the plasma electrode module in a form of pulsed waves.

The pulsed waves may be at a frequency in a range higher than 3 kHz and lower than 7.5 kHz.

The pulsed waves may have a pulse width in a range longer than 3 seconds and shorter than 5 seconds.

The input port, the output port, and the ground electrode may be disposed at a same side of the reactor.

The ground electrode and the plasma electrode module may be disposed to face each other.

The plasma electrode module may include: a conductive substrate including a plurality of holes; a ceramic layer surrounding a portion of an outer surface of the conductive substrate; and a plurality of plasma electrodes disposed in respective holes and having a multilayer structure in which a cylindrical ground portion, a fixed portion, and a discharge portion are sequentially stacked. The ground portion may be in contact with the conductive substrate and plasma is generated on the discharge portion.

The conductive substrate may have a plate shape or a cylinder shape.

The ground portion, the fixed portion, and the discharge portion may be integrally formed in a cylindrical structure and may be made of a same material having corrosion resistance.

The discharge portion disposed at a top may have a smallest diameter and the ground portion disposed at a bottom may have a largest diameter so that a diameter of the plasma electrode decreases toward the top.

The pretreatment apparatus may further include a coagulant injector disposed between the first underwater plasma discharge unit and the membrane separation unit.

The pretreatment apparatus may further include a backwashing unit configured to supply filtrate discharged from the membrane separation unit as backwashing water to the membrane separation unit.

The backwashing unit may include a second underwater plasma discharge unit configured to perform plasma treatment of the backwashing water and supply the plasma-treated backwashing water to the membrane separation unit.

The first underwater plasma discharge unit may supply gas generated through underwater discharging in a form of microbubbles to the membrane separation unit.

The reactor may further include a gap adjuster configured to adjust a gap between the ground electrode and the plasma electrode module.

The gap adjuster may be formed to face both surfaces of the reactor and configured to increase or reduce a height of the reactor to adjust water storage capacity of the reactor and the gap between the ground electrode and the plasma electrode.

The membrane separation pretreatment apparatus including the underwater plasma discharge unit according to one or more exemplary embodiments can improve filtration performance and durability of a filter by causing underwater plasma discharging at a preceding stage to the filter.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
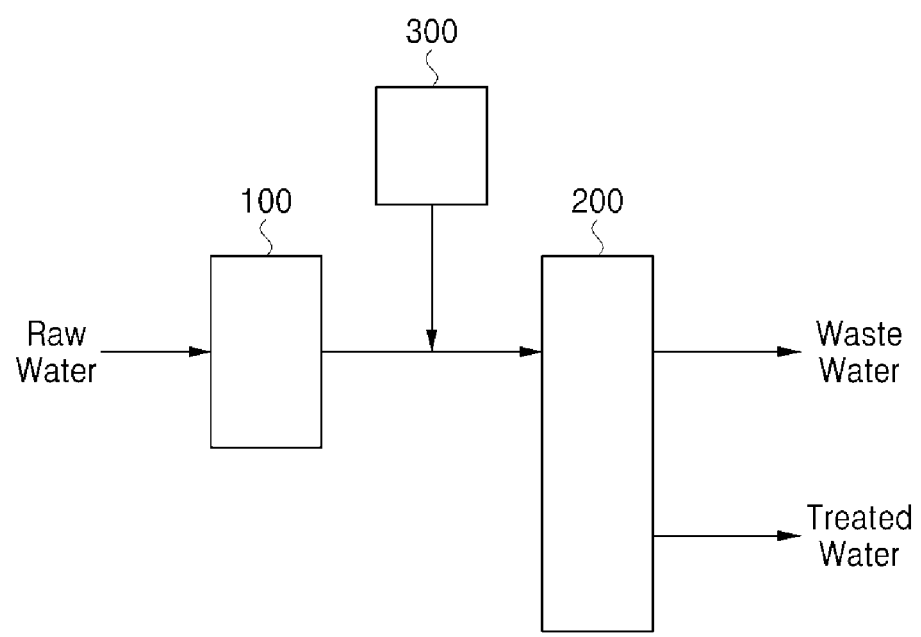
FIG. 1 is a diagram schematically illustrating a membrane separation pretreatment apparatus including an underwater plasma discharge unit according to an exemplary embodiment.

It is noted that terms or words used in the claims should not be interpreted as being limited to their usual or dictionary meanings but should be interpreted per meanings and concepts consistent with the technical idea of the present disclosure.

The disclosure is not limited to an embodiment disclosed below and may be implemented in various forms. In other words, the scope of the disclosure is not limited to the following embodiments. In addition, all changes or modifications derived from the meaning and scope of the claims and their equivalents should be construed as being included within the scope of the disclosure. In the following description, a configuration that is publicly or well known or may be derived from the disclosure may be omitted.

Terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably It is further understood that a singular expression also includes the plural meaning where not contrary to the context. In this specification, terms such as "comprises," "comprising", "includes," "including", "have/has" and/or "having" should be construed as designating that there are such features, regions, integers, steps, operations, elements, components, and/or a combination thereof in the specification, not to exclude the presence or possibility of adding one or more of other features, regions, integers, steps, operations, elements, components, and/or a combination thereof.

It will be understood that, although the identification symbols may be used herein to describe various steps, the terms are used only for distinguishing one element step from another step, and the essence, sequence, or order of the steps are not limited by the terms. Therefore, unless explicitly stated for the order of each step, the steps may be performed in a different order from the order in which the steps are described or termed. That is, each of the steps may be performed in the same order as described herein, or substantially simultaneously, or in reverse order.

In an exemplary embodiment, "a module," "a unit," or "a part" performs at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

Hereinafter, embodiments will be described in detail with reference to the accompanying drawings. However, the disclosure may be embodied in many different forms and is not limited to the embodiments described herein, and those skilled in the art may implement various modified forms of the contents described herein without departing from the scope of the disclosure. In order to clearly illustrate the disclosure in the drawings, some of the elements that are not essential to the complete understanding of the disclosure may be omitted, and like reference numerals refer to like elements throughout the specification.

FIG. 1 is a schematic view of a membrane separation pretreatment apparatus including an underwater plasma discharge unit according to an exemplary embodiment. Referring to FIG. 1, the membrane separation pretreatment apparatus includes a membrane separation unit 200 and a first underwater plasma discharge unit 100 disposed in front of the membrane separation unit 200.

The membrane separation unit 200 is a microporous filter device including at least one filter selected from among an ultrafiltration (UF) filter and a dual media filtration (DMF) filter. The membrane separation unit 200 filters raw water to remove particulate matter contained in the raw water and discharges filtered water (i.e., filtrate).

The first underwater plasma discharge unit 100 lowers the load to the membrane separation unit 200 by primarily treating the raw water to be treated by the membrane separation unit 200, and improves filtration efficiency and durability of the filter of the membrane separation unit 200. Because the first underwater plasma discharge unit 100 lowers the concentration of organic matter or microorganism contained in the raw water to be supplied to the membrane separation unit 200, it is possible to prevent organic materials or microorganisms from deteriorating coagulation efficiency and to prevent deterioration of filtration efficiency in the membrane separation unit 200.

The membrane separation pretreatment apparatus may further include a coagulant injector 300 disposed between the first underwater plasma discharge unit 100 and the membrane separation unit 200. The coagulant injector 300 injects a coagulant into the primarily treated water that is plasma-treated by the first underwater plasma discharge unit 100 to coagulate organic materials or suspended solids in the primarily treated water to enable effective filtration of the membrane separation unit 200. An iron salt such as $FeCl_3$ may be used as the coagulant, but the usable coagulant is not limited thereto.

Here, because the first underwater plasma discharge unit 100 is installed in front of the membrane separation unit 200, the filtration load of the membrane separation unit 200 can be sufficiently lowered. This significantly reduces the amount of coagulant used. However, depending on the quality of the raw water, the turbidity of the treated water discharged from the membrane separation unit 200, the concentration of total suspended solids (TSS), and the concentration of organic materials in the treated water may be high. Therefore, it is preferable to adjust the amount of coagulation injected by the coagulant injector 300 according to the quality of the raw water.

Figure 2:
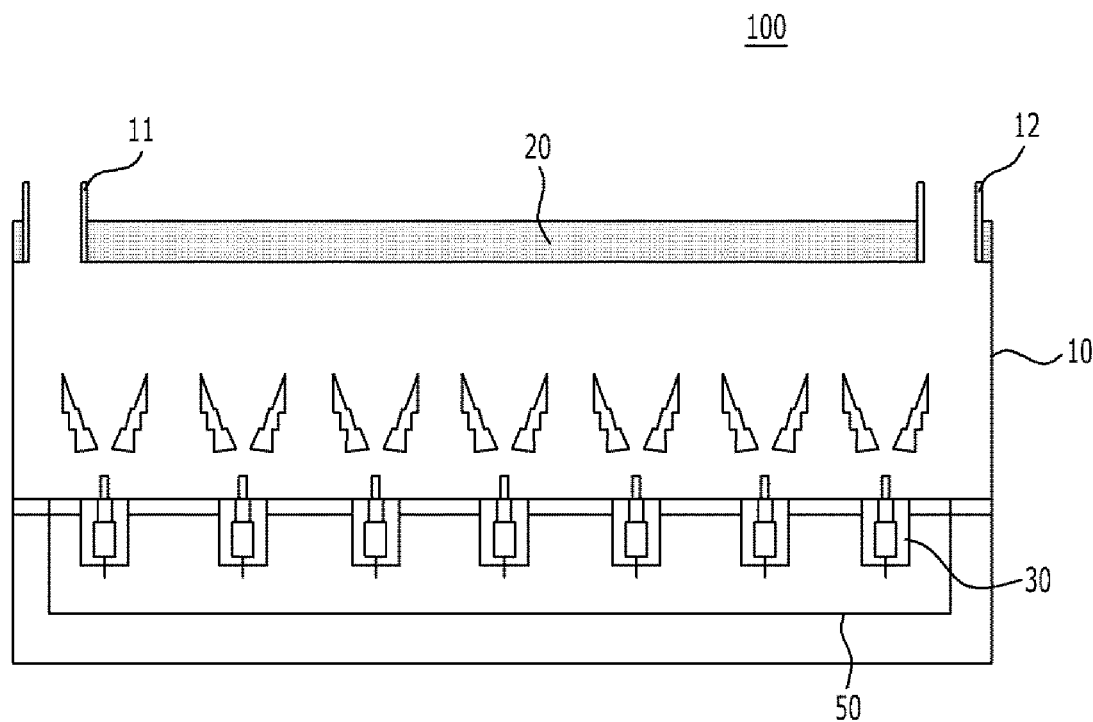
FIG. 2 is a diagram schematically illustrating an underwater plasma discharge unit included in the membrane separation pretreatment apparatus according to an exemplary embodiment.
Figure 3:
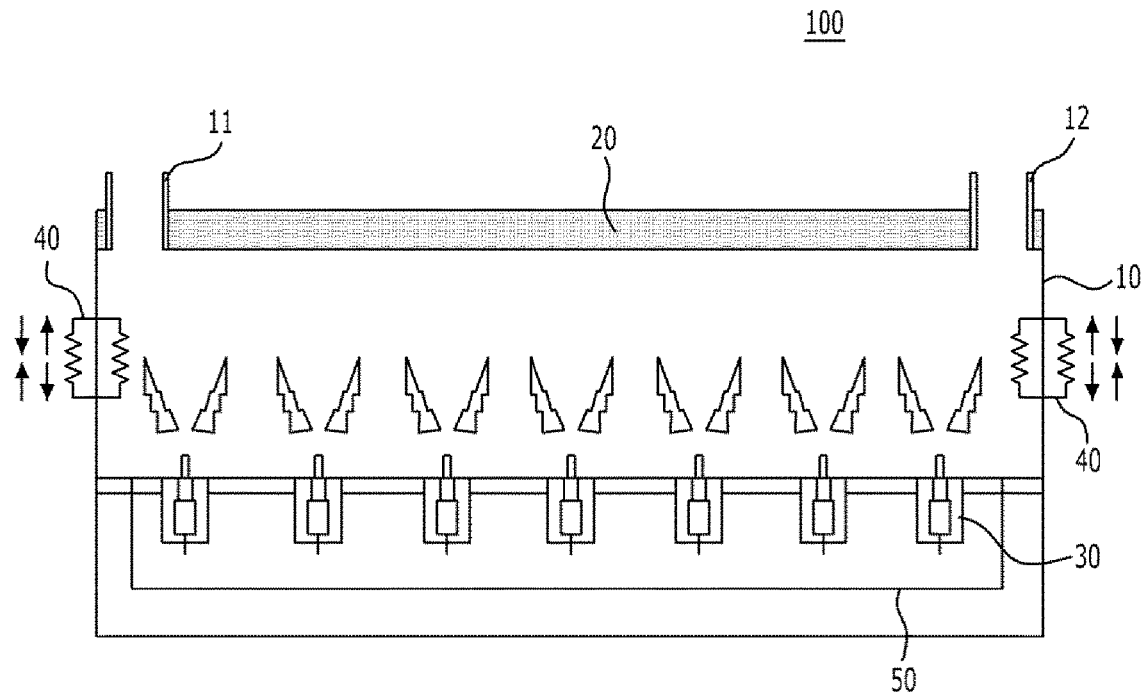
FIG. 3 is a diagram schematically illustrating an underwater plasma discharge unit included in the membrane separation pretreatment apparatus according to another exemplary embodiment.

FIG. 2 is a schematic diagram of the first underwater plasma discharge unit 100 included in the membrane separation pretreatment apparatus according to an exemplary embodiment. FIG. 3 is a diagram schematically illustrating the first underwater plasma discharge unit 100 included in the membrane separation pretreatment apparatus according to another exemplary embodiment.

For example, the first underwater plasma discharge unit 100 according to the exemplary embodiment performs underwater discharging to generate plasma including ozone and OH radicals in water, and decomposes or removes organic materials and microorganisms present in the raw water to prevent biofouling. In addition, the first underwater plasma discharge unit 100 performs underwater discharging to generate gas such as oxygen, ozone, and hydrogen, and releases the gas in the form of microbubbles that have the effect of physically washing the interior of the membrane separation unit 200.

In a related art, chlorine was injected into raw water such as seawater before pretreatment of the raw water to suppress bio-fouling attributable to organic materials. However, the related art technology poses problems such as corrosion of parts of the apparatus due to excessive injection of chlorine. In contrast, according to the exemplary embodiment, organic materials and microorganisms are effectively removed using underwater discharged plasma to suppress biofouling instead of chlorine. Therefore, the exemplary embodiment has the advantage of preventing biofouling without causing corrosion on the parts of the apparatus. Accordingly, filtration efficiency is improved in the subsequent process performed by the membrane separation unit 200, and the service life of the membrane separation unit 200 is prolonged.

For example, a pulse width or voltage of pulsed waves applied to a plasma electrode 30 of the first underwater plasma discharge unit 100 is changed for corona discharge or arc discharge to generate underwater discharge plasma. The underwater discharge plasma purifies water through cell disruption by shock waves, cell disruption by ultrasonic waves, cell disruption by a high voltage electric field, and so forth.

The cell disruption by a shock wave is based on the principle that a rapid pressure change causes a shock wave which destroys cells. In this case, the cell disruption depends on the size, shape and thickness of cells, and the intensity of the shock wave.

The cell disruption by an ultrasonic wave is based on the principle that an ultrasonic wave causes cavitation while propagating through a liquid medium. The cavitation is a phenomenon in which an vibrating longitudinal wave is created when the ultrasonic wave generated by an ultrasonic transducer passes through a liquid medium. The vibrating longitudinal wave creates a dense zone with a high liquid density and a scarce zone with a low liquid density. When the pressure in the scarce zone is lower than the vapor pressure of the liquid, bubbles are generated and burst. That is, cells are destroyed by a shock wave generated by bubbles burst. This method is usually used to destroy a small number of microbial cells.

The cell disruption by a high voltage electric field is a method of breaking an insulator called a cell membrane by inducing a high potential difference in the cell membrane. Therefore, the survival rate of plankton and bacteria can be drastically reduced by the comprehensive action of ultraviolet rays, active species, shock waves, and bubbles generated during plasma discharge.

Referring to FIG. 2, the first underwater plasma discharge unit 100 may include a reactor 10 having an input port 11 through which raw water is fed and an output port 12 through which treated water is discharged, a ground electrode 20 disposed in a first side of the reactor 10, and a plasma electrode module 50 disposed in a second side of the reactor 10 and configured to generate plasma.

The reactor 10 includes the input port 11 through which raw water is fed to the reactor 10 and the output port 12 through which purified water is discharged from the reactor 10. The reactor 10 can contain raw water to be treated. The type of the reactor 10 is not limited and can be formed in various shapes. For example, the reactor 10 may have a rectangular parallelepiped shape. The first side of the reactor 10 is provided with the ground electrode 20 and the second side of the reactor 10 is provided with the plasma electrode module 50 including a plasma electrode 30 that generates plasma.

While positions of the input port 11 and the output port 12 are not particularly limited, it is preferable that the input port 11 and the output port 12 are disposed on the same side (i.e., same plane) when the reactor 10 has a rectangular parallelepiped shape. It is preferable that the ground electrode 20, the input port 11, and the output port 12 are provided on the same side and the plasma electrode 30 is preferably arranged to face the ground electrode 20. In this case, the ground electrode 20 having a flat plate shape may serve as an upper surface of the reactor 10, and the input port 11 and the output port 12 are formed to pass through the ground electrode 20.

Referring to FIG. 3, the reactor 10 may further include a gap adjuster 40 that adjusts a gap between the ground electrode 20 and the plasma electrode 30 located in the plasma electrode module 50. The voltage applied to the plasma electrode 30 and the gap between the ground electrode 20 and the plasma electrode 30 may be adjusted according to a type or quality of raw water to be treated. The gap adjuster 40 includes components that are arranged to respectively the first side surface and the second side surface of the reactor 10 to reduce or increase the height of the reactor 10, in which the first side surface and the second side surface are opposite to each other. In this way, the gap adjuster 40 adjusts the feed water storage capacity of the reactor 10 and the gap between the ground electrode 20 and the plasma electrode 30.

Electric power in a form of pulsed waves is supplied to the plasma electrode module 50.

It is preferable that the frequency of the pulsed waves applied to the plasma electrode module 50 is higher than 3 kHz and lower than 7.5 kHz. If the frequency of the input pulsed waves is 3 kHz or less, there is a problem that plasma is not generated. On the other hand, if the frequency of the input pulsed waves exceeds 7.5 kHz, there is a problem that the power consumption is excessively increased. Therefore, the frequency of the pulsed waves is preferably higher than 3 kHz or lower than 7.5 kHz.

In addition, it is preferable that the pulse width of the pulsed waves applied to the plasma electrode module 50 is in a range of 3 seconds or more and less than 5 seconds. If the pulse width is shorter than 3 seconds, there is a problem that the amount of generated plasma is insufficient. On the other hand, if the pulse width is longer than 5 seconds, the amount of generated plasma is sufficient but the power consumption per unit amount of plasma is excessively large. That is, plasma discharge efficiency is deteriorated. Therefore, preferably, the pulse width of the pulsed waves is longer than 3 seconds and shorter than 5 seconds.

The ground electrode 20 is a commonly occurring electrode and is disposed on one side of the reactor 10 (i.e., the first side in the exemplary embodiments). The ground electrode 20 has a flat plate shape and serves as one surface of the reactor 10. The ground electrode 20 is in contact with raw water to be treated so that the raw water is grounded.

For example, the plasma electrode 30 is made of tungsten or stainless steel (SUS) and is connected to a power supply unit. The power supply unit applies voltage pulses, alternating current (AC) voltage, or direct current (DC) voltage to the plasma electrode 30 to generate underwater discharge plasma.

The plasma electrode 30 is disposed on the second side of the reactor 10 and is preferably installed to face the ground electrode 20. A plurality of the plasma electrodes 30 may be installed depending on the amount of raw water to be treated. The plasma electrode 30 may be an array of electrodes. The array of electrodes may be provided in a form of individual electrodes or in a form of a module (hereinafter, referred to as plasma electrode module 50).

If the plasma electrode module 50 includes the plurality of plasma electrodes 30, the number of plasma electrodes constituting the plasma electrode module 50 is preferably in a range of 2 to 30.

If the plasma electrode module 50 includes a smaller number of plasma electrodes than required, it is difficult to obtain sufficient water treatment efficiency. On the contrary, if the plasma electrode module 50 includes a larger number of plasma electrodes than required, water quality is deteriorated due to a decrease in dissolved oxygen (DO) and cost effectiveness decreases due to the increase in power consumption.

Figure 4:
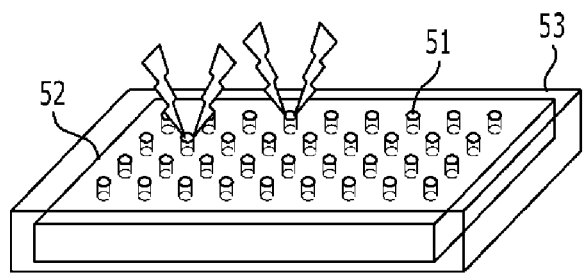
FIGS. 4 and 5 are diagrams schematically illustrating a plasma electrode module.
Figure 5:
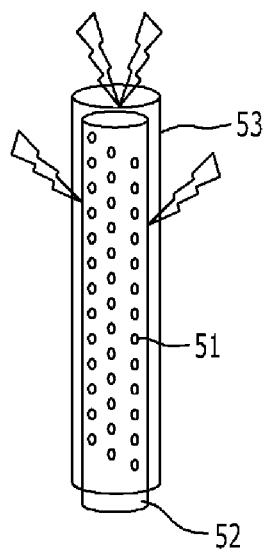

FIGS. 4 and 5 schematically illustrate a plasma electrode module 50 according to an exemplary embodiment. Referring to FIGS. 4 and 5, the plasma electrode module 50 includes a conductive substrate 52 having a plurality of holes 51 and a ceramic layer 53 surrounding a portion of an outer surface of the conductive substrate 52. The multiple plasma electrodes 30 are disposed in the respective holes 51.

The conductive substrate 52 may have a plate shape or a cylinder shape. If the conductive substrate 52 has a plate shape, plasma and microbubbles can be supplied to a relatively wide area. On the other hand, if the conductive substrate 52 has a cylinder shape, high density plasma and high density microbubbles can be supplied to a relatively narrow area. Therefore, the form of the conductive substrate 52 is suitably selected depending on its use.

The ceramic layer 53 is formed to partially surround the outer surface of the conductive substrate 52 to protect the conductive substrate 52. Plasma or microbubbles generated by the plasma electrodes 30 installed in the respective holes 51 can move along the exposed surface of the conductive substrate 52, which is not covered by the ceramic layer 53.

For example, the ceramic layer 53 may be formed to surround the entire surface of the conductive substrate 52 except for the area in which the holes 51 are formed. That is, the ceramic layer 53 may be formed on the surface of the conductive substrate 52 except for the surface on which the holes 51 are formed. However, it is understood that the shape of the ceramic layer 53 is not limited thereto, and may be changed or vary according to one or more other exemplary embodiments.

A diameter of the holes 51 formed in the conductive substrate 52 is set to be in a range of 1 to 10 mm. If the diameter of the holes 51 is less than 1 mm, because the size of the holes 51 is smaller than the size of the plasma electrodes 30, recombination of plasma radicals generated in the plasma electrode 30 increases, thereby reducing the plasma effect of removing organic materials, microorganisms, or the like. On the other hand, if the diameter of the holes 51 is larger than 10 mm, the size of generated microbubbles is excessively large, resulting in deterioration in diffusion of the microbubbles. For this reason, it is difficult to obtain an effect of coagulating organic materials, an effect of floating organic materials, and an effect of cleaning the membrane separation unit.

In addition, the holes 51 are preferably arranged at intervals of 90 mm to 120 mm. This is to increase the cleaning efficiency of the membrane separation unit 200 by uniformly maintaining the size of the microbubbles generated in the plasma electrodes 30 and controlling a region in which the microbubbles are diffused. For example, if the distance between adjacent holes 51 is less than 90 mm, the probability of collision of microbubbles generated in different holes 51 increases. This causes the microbubbles to grow into large bubbles and reduces the cleaning effect of the membrane separation unit 200. On the other hand, if the distance between the adjacent holes 51 is greater than 120 mm, turbulence is not sufficiently formed in a lower region between the holes 51. In this case, flocs condensed in water to be treated precipitates, causing a problem of forming a floc cake.

That is, the diameter of the holes 51 is set in a range of 1 to 10 mm and the interval between each of the multiple holes 51 is set in a range of 90 to 120 mm to generate and preserve microbubbles having uniform sizes in a range of 30 to 100 μm to increase the cleaning efficiency of the microbubbles with respect to the membrane separation unit 200 and to increase the service life and filtration efficiency of the membrane separation unit 200.

Figure 6:
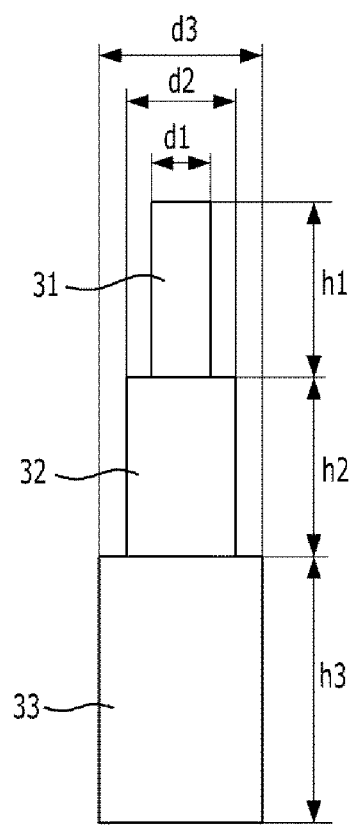
FIG. 6 is a diagram illustrating a plasma electrode.

FIG. 6 is a diagram illustrating the plasma electrode 30. Referring to FIG. 6, the plasma electrode 30 has a multilayer structure in which a ground portion 33 having a cylinder shape, a fixed portion 32, and a discharge portion 31 for generating plasma are sequentially stacked. The ground portion 33 is in contact with the conductive substrate 52, and plasma is generated around the discharge portion 31.

The ground portion 33, the fixed portion 32, and the discharge portion 31 may be integrally formed in a body. That is, the plasma electrode 30 is a one-piece body. In this case, it is possible to prevent one plasma electrode from broken when the plasma electrode 30 is applied with a higher voltage than necessary. That is, the plasma electrode 30 has high durability and can be easily replaced if necessary.

The plasma electrode 30 is a one-piece body such that the elements of the plasma electrode 30 are made of the same material having corrosion resistance. Tungsten, tungsten alloy, stainless steel, or the like may be used as the material having corrosion resistance. It is preferable to use stainless steel as the material of the plasma electrode 30.

While a shape of the ground portion 33, the fixed portion 32, and the discharge portion 31 is not particularly limited, it is preferable that the ground portion 33, the fixed portion 32, and the discharge portion 31 have a cylinder shape to stably generate plasma. As illustrated in FIG. 6, the discharge portion 31 that is an uppermost portion has the smallest diameter d1, and the ground portion 33 that is a lowermost portion has the largest diameter d3.

Such an arrangement in which the diameter of the plasma electrode 30 decreases toward the top is advantageous in terms of an insulation efficiency and a discharge efficiency of the plasma electrode 30. To maximize the insulation efficiency and the discharge efficiency of the plasma electrode 30, a ratio of the diameters d3, d2, and d1 of the ground portion 33, the fixed portion 32, and the discharge portion 31 is preferably 12 to 16:8 to 10:1 to 2 (d3:d2:d1). On the other hand, a ratio of h3, h2, and h1 is preferably 1 to 2:1:1 (h3:h2:h1).

Figure 7:
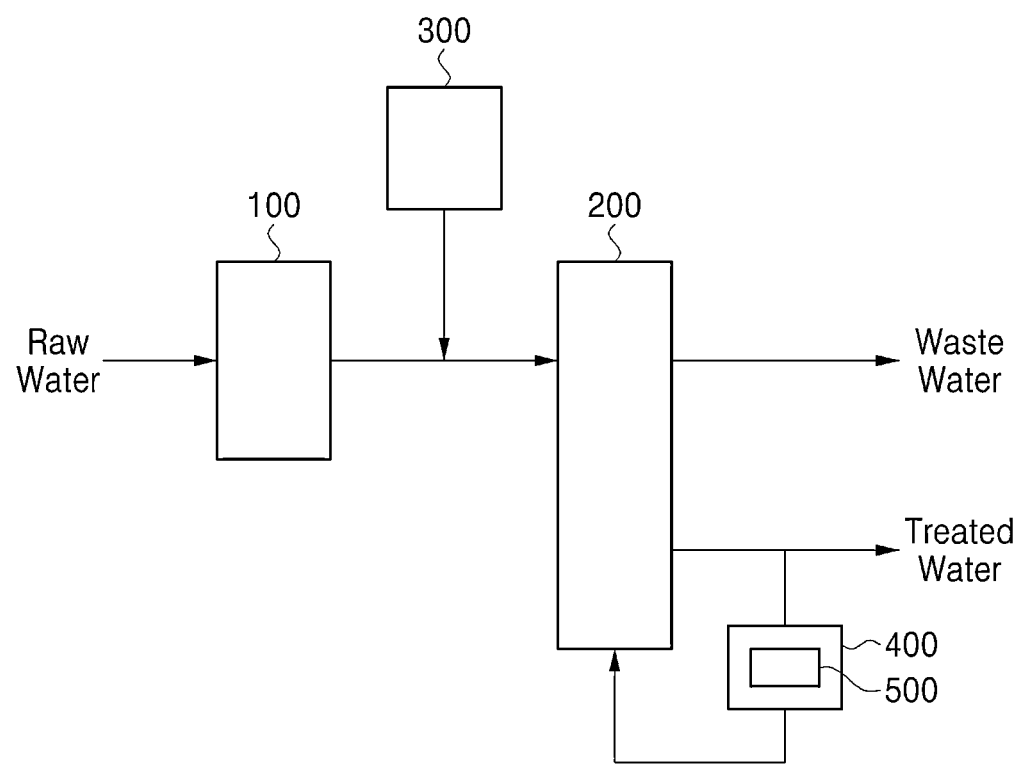
FIG. 7 is a diagram schematically illustrating a membrane separation pretreatment apparatus including an underwater plasma discharge unit according to another exemplary embodiment.

FIG. 7 is a diagram schematically illustrating a membrane separation pretreatment apparatus including an underwater plasma discharge unit according to another exemplary embodiment.

Referring to FIG. 7, a membrane separation pretreatment apparatus includes a membrane separation unit 200, a first underwater plasma discharge unit 100 disposed in front of the membrane separation unit 200, a coagulant injector 300 disposed between the first underwater plasma discharge unit 100 and the membrane separation unit 200, and a backwashing unit 400 that returns the filtrate discharged from the membrane separation unit 200 to the membrane separation unit 200 as backwashing water.

Here, because the membrane separation unit 200, the first underwater plasma discharge unit 100, and the coagulant injector 300 are the same as those described above with reference to FIGS. 1 through 6, a redundant description will be omitted.

The backwashing unit 400 functions to recover the filtration performance of the membrane separation unit 200 whose filtration performance has deteriorated over time. The backwashing unit 400 is automatically operated when the pressure or quality of the treated water discharged from the membrane separation unit 200 is higher than the wastewater standards. Alternatively, the backwashing unit 400 may be periodically operated at predetermined intervals or manually operated by an operator.

The backwashing unit 400 includes a pump. The pump is used to supply the treated water discharged from the membrane separation unit 200 to the membrane separation unit 200 as backwashing water.

The backwashing unit 400 may further include a second underwater plasma discharge unit 500 to perform plasma treatment of backwashing water and then supply the plasma-treated backwashing water to the membrane separation unit 200. Because the second underwater plasma discharge unit 500 is the same as the first underwater plasma discharge device 100 described above, a redundant description will be omitted.

The treated water sequentially passing through the first underwater plasma discharge unit 100 and the membrane separation unit 200 exhibits water quality in which the turbidity is 0.2 NTU or less and the total suspended solids concentration is 2 mg/L or less. The treated water may still contain a small amount of organic matter and a small amount of suspended matter. If such treated water is used as backwashing water as it is, the cleaning efficiency of the membrane separation unit 200 may be deteriorated.

However, if the second underwater plasma discharge unit 500 is added to the backwashing unit 400, the treated water is purified again by the second underwater plasma discharge unit 500 before being used as backwashing water, and the cleaning efficiency of the membrane separation unit 200 by the backwashing unit 400 is increased.

Hereinafter, specific actions and effects of the exemplary embodiments will be described with reference to examples. However, it is understood that the examples are presented for only illustrative purposes, and the scope of the disclosure is not limited thereto.

Test Example 1

The membrane separation pretreatment apparatus illustrated in FIG. 1 was used, and a DMF filter was used as a membrane separation unit 200. A water purification system was operated while varying the concentration of $FeCl_3$ that is a coagulant added to water to be treated. The turbidity and total suspended solids (TSS) concentration of raw water and treated water discharged from the membrane separation unit 200 were measured. The measurement results are shown in FIGS. 8A to 9B. The concentration of chlorophyll-A that is an organic material and the organic material removal efficiency in each of the raw water and the treated water were measured. The measurement results are shown in FIGS. 10A to 11B.

In FIGS. 8A to 11B, references "raw water", "medium DMF", "normal DMF", and "plasma" denote positions at which samples were obtained. For example, reference "raw water" means that the sample was obtained from raw water, reference "medium DMF" means that the sample was obtained from treated water passing through a medium DMF filter, reference "normal DMF" means that the sample was obtained from treated water passing through a normal DMF filter, and reference "plasma" means that the sample was obtained from treated water passing through the plasma discharge unit.

FIGS. 8A, 8B, 10A and 10B show measurement results for cases in which underwater discharge plasma was not generated, and FIGS. 9A, 9B, 11A, and 11B show measurement results for cases in which underwater discharge plasma was generated.

Figure 8A:
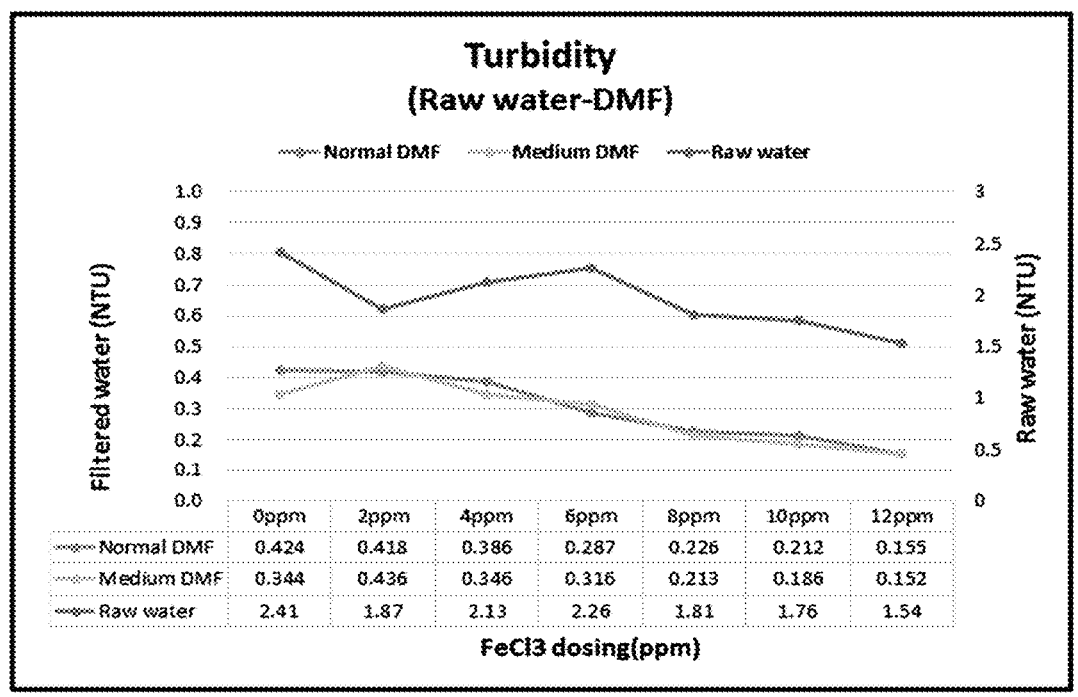
FIGS. 8A, 8B, 9A, 9B, 10A, 10B, 11A, and 11B are diagrams illustrating results of Test Example 1.
Figure 8B:
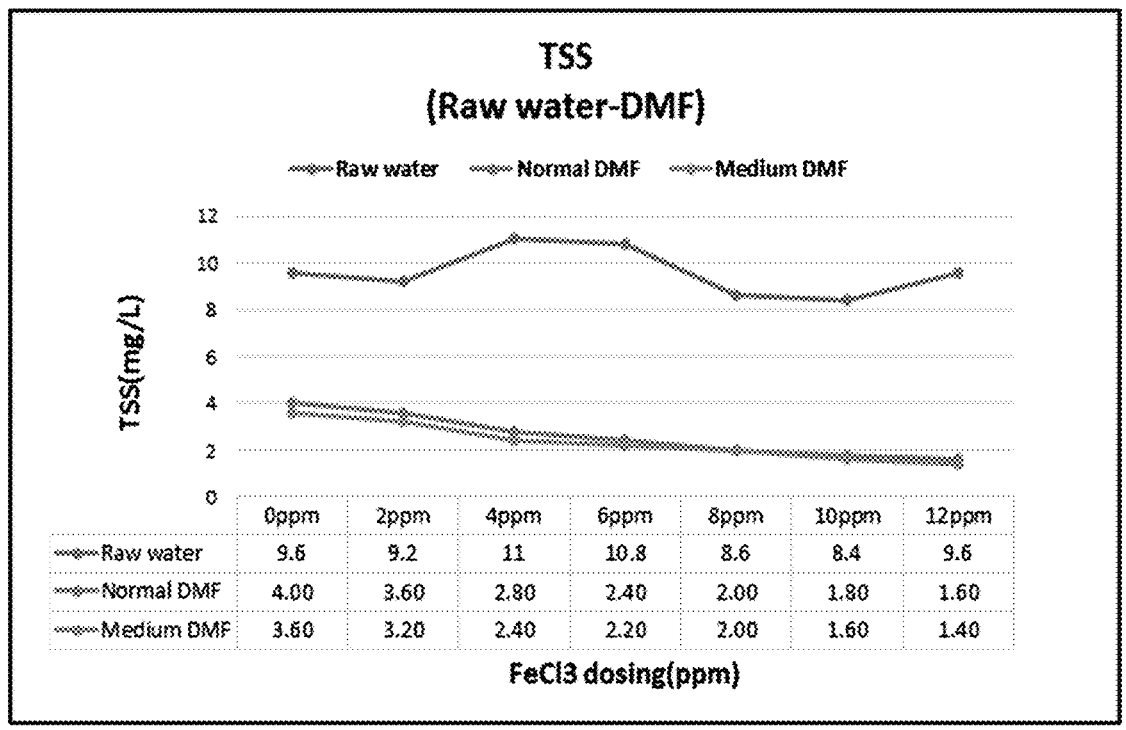

Referring to FIGS. 8A and 8B, in the case in which underwater discharge plasma was not generated, the coagulant added to the sample was required to be at least 12 ppm to satisfy the purified water standards in which the turbidity is 0.2 NTU or less and the concentration of total suspended solids (TSS) is 2 mg/L or less.

Figure 9A:
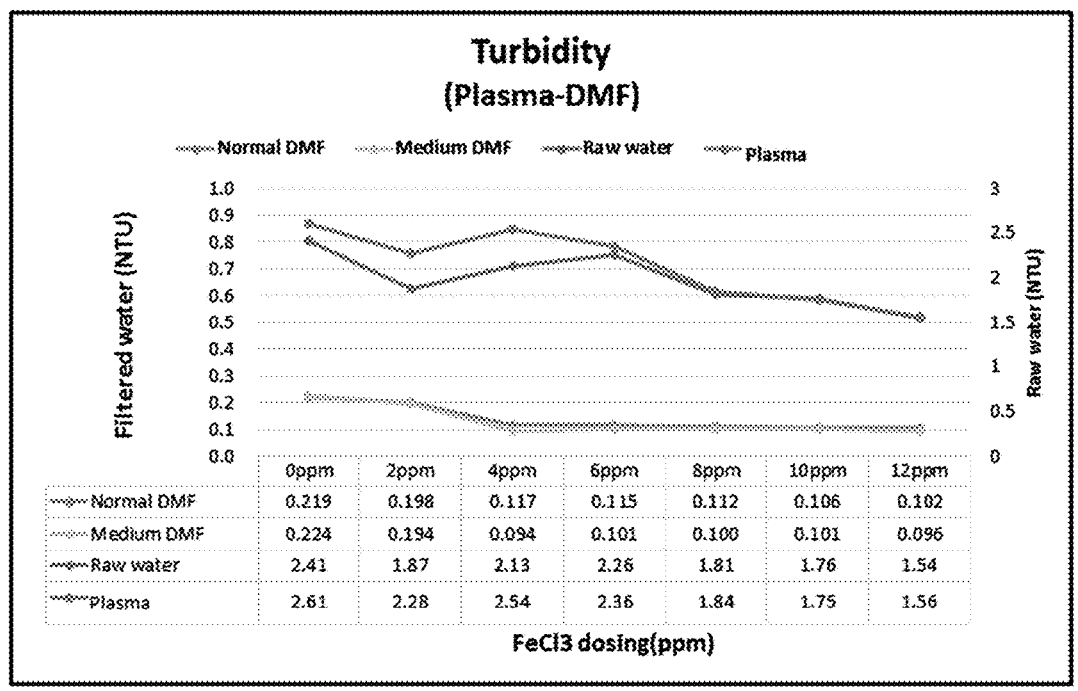
Figure 9B:
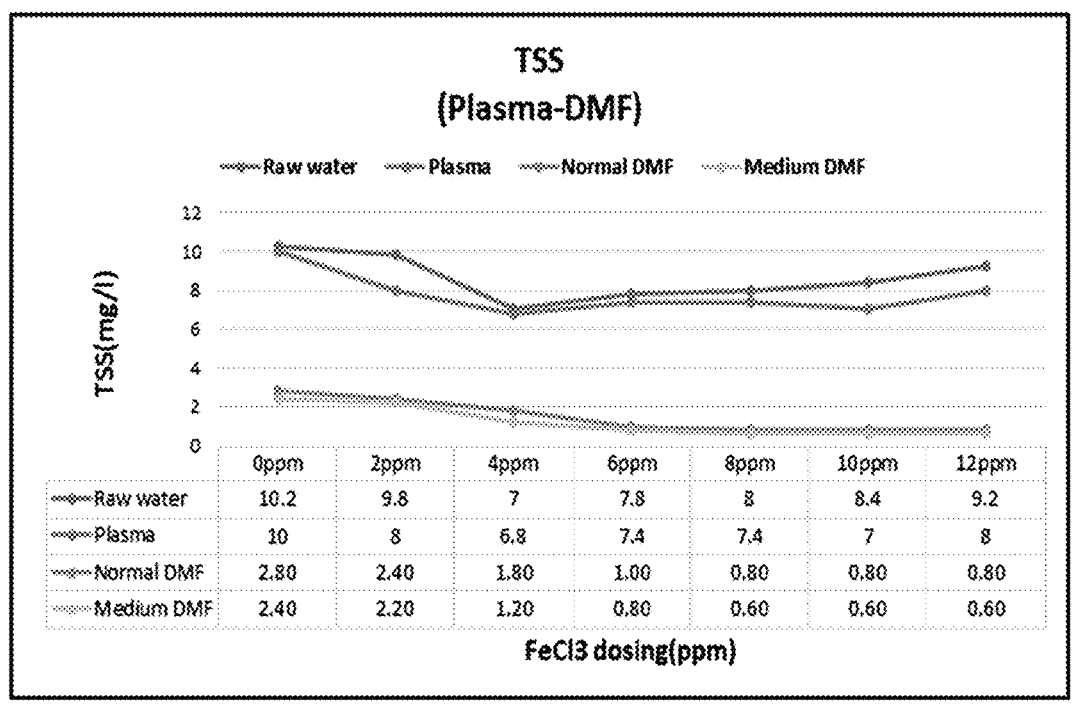

Referring to FIGS. 9A and 9B, in the case in which underwater discharge plasma was generated, the coagulant added to the sample was at least 4 ppm to satisfy the purified water standards in terms of turbidity and total suspended solids was 4 ppm. That is, the usage of coagulant was reduced to about one-third compared to the case in which underwater discharge plasma was not generated.

Figure 10A:
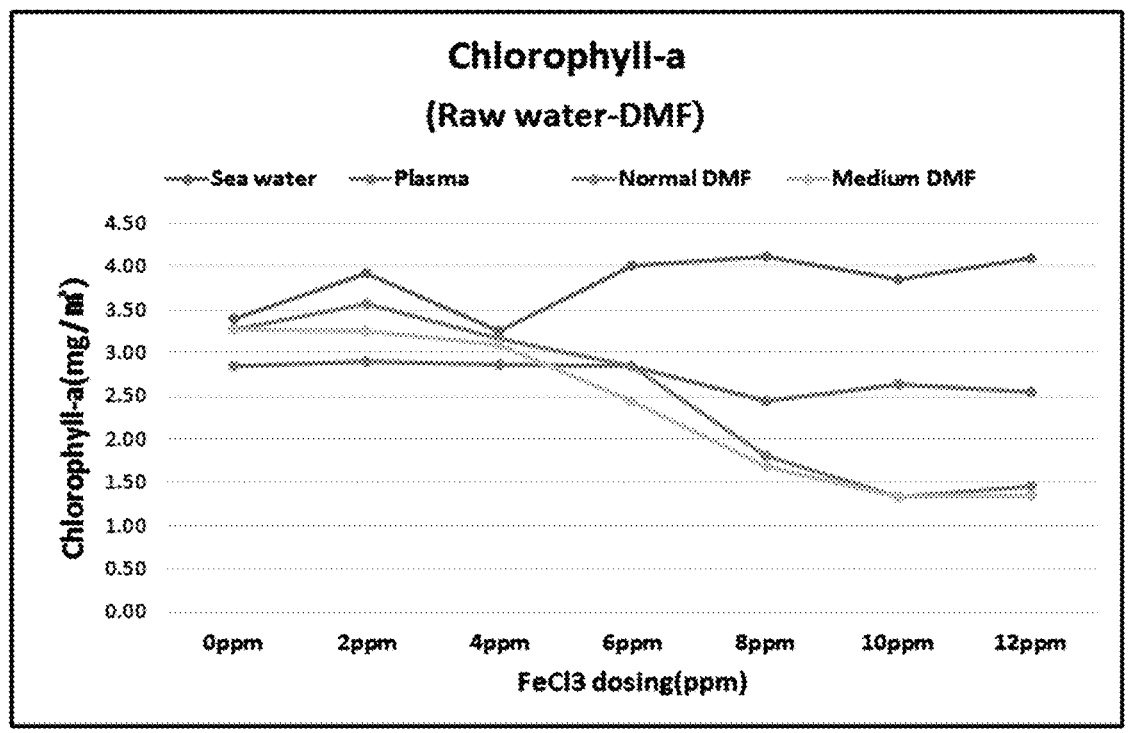
Figure 10B:
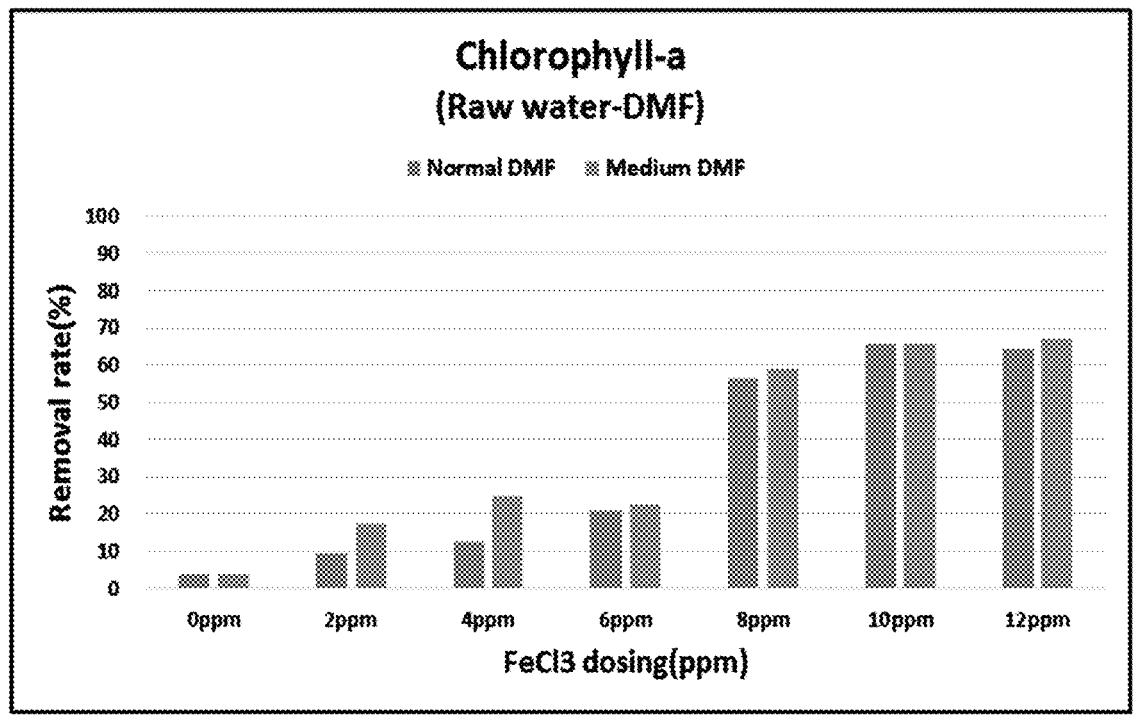

Referring to FIGS. 10A and 10B, in the case in which underwater discharge plasma was not generated, the organic material removal efficiency was high when the coagulant was added to the sample in a concentration of 10 ppm. However, although the coagulant added to the sample was increased to be more than 10 ppm, an increase in the organic material removal efficiency was insignificant.

Figure 11A:
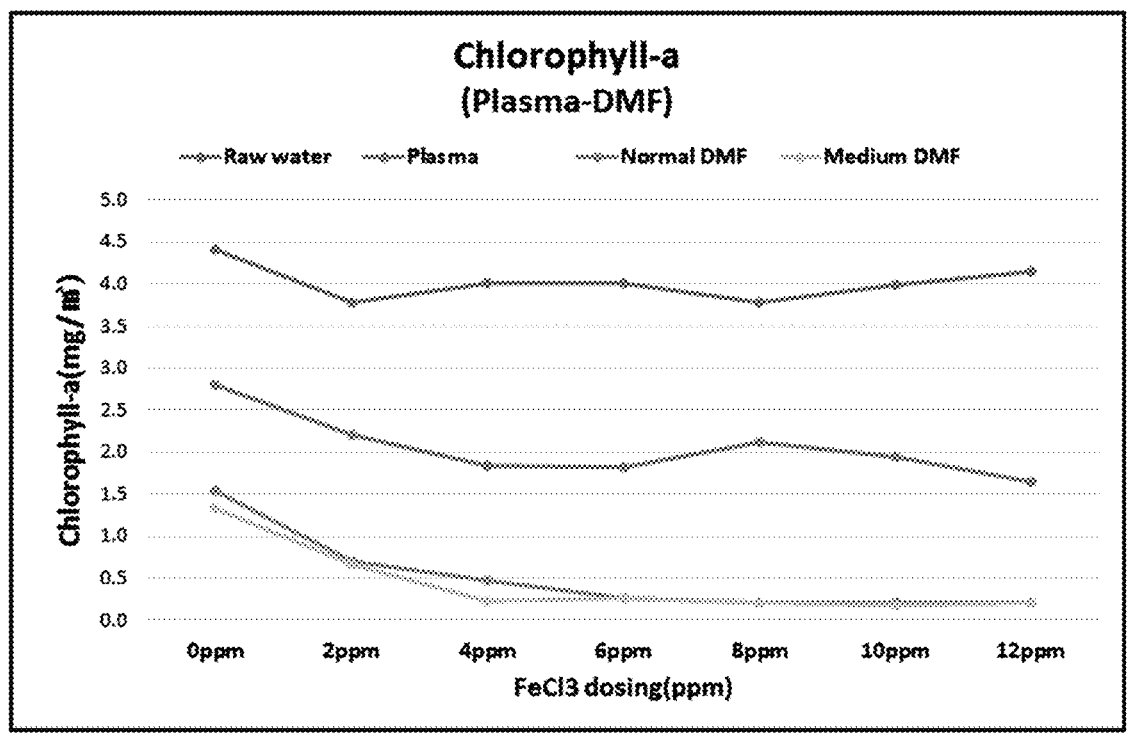
Figure 11B:
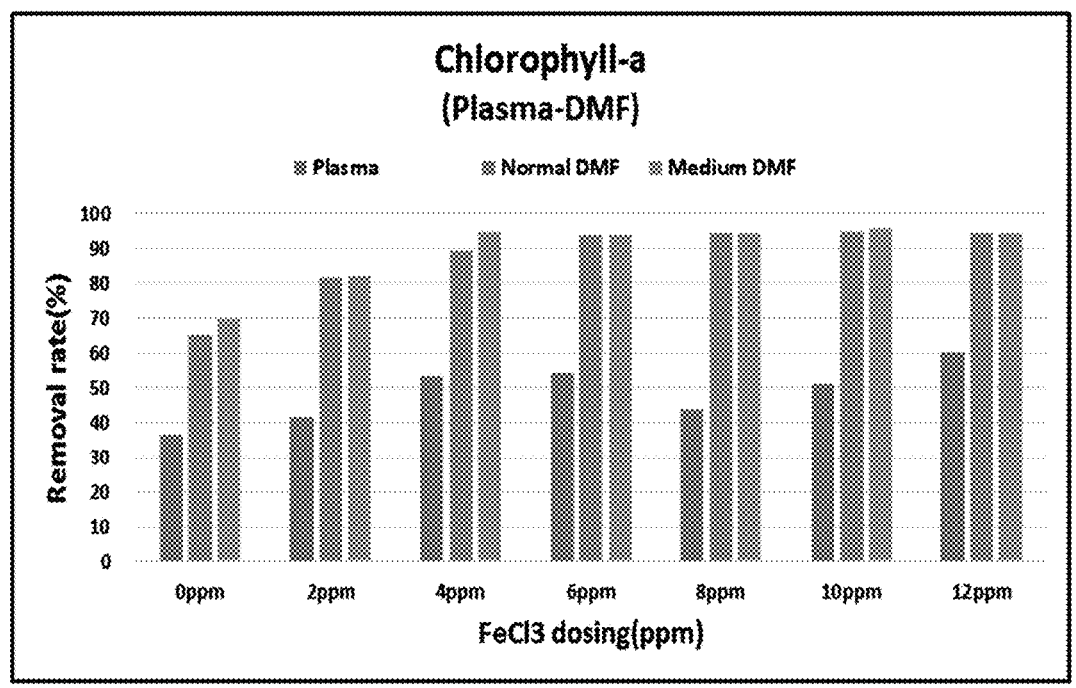

Referring to FIGS. 11A and 11B, in the case in which the underwater discharge plasma was generated, it was confirmed that about 65% of the organic material was removed when no coagulant was added, and more than 90% of the organic material was removed when the coagulant was added in a concentration of 4 ppm or more.

Therefore, in the case in which the membrane separation pretreatment apparatus according to the exemplary embodiments was used and plasma treatment was performed in front of the membrane separation unit 200, it was confirmed that the turbidity, the concentration of total suspended solids, and the concentration of the organic material were dramatically reduced even though only a small amount of coagulant was used.

Test Example 2

The membrane separation pretreatment apparatus illustrated in FIG. 1 was used and a UF filter was used as the membrane separation unit 200. In this case, changes in differential pressure of the UF filter according to filtration time were measured. The measurement results are illustrated in FIG. 12.

The apparatus was operated for 24 hours at a filtration rate of 65 L/m²·h. In this case, no coagulant was added. In FIG. 12, reference UF #1 denotes a case in which underwater discharge plasma was not generated, and reference UF #2 denotes a case in which underwater discharge plasma was generated.

Figure 12:
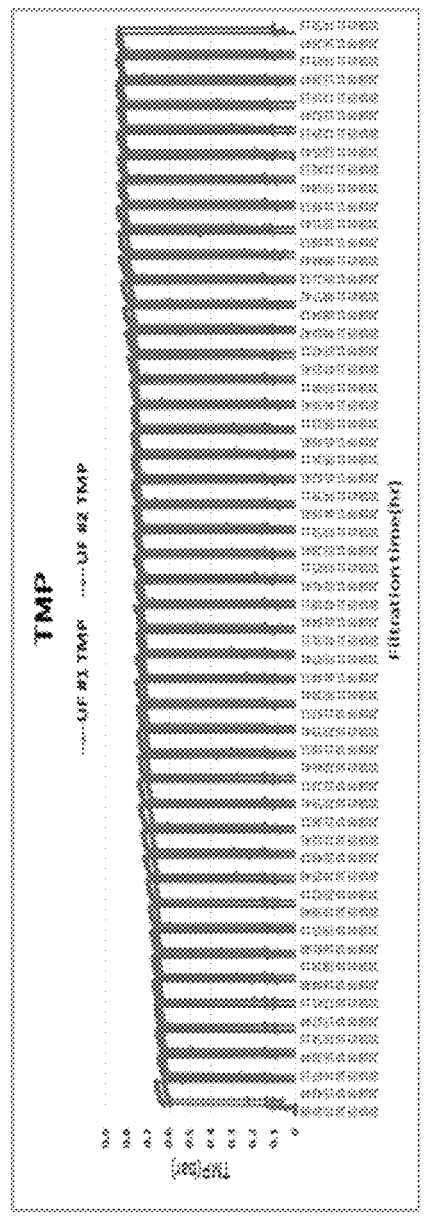
FIG. 12 is a diagram illustrating results of Test Example 2.

Referring to FIG. 12, it was confirmed that when the plasma treatment was performed, the membrane differential pressure was reduced by about 0.05 bar compared to the case in which the plasma treatment was not performed.

Test Example 3

The underwater plasma discharge unit according to the exemplary embodiment was operated in a condition in which the frequency and pulse width of pulsed waves applied to the plasma electrode module 50 were changed. Plasma discharge efficiency and power consumption for plasma discharge were measured for each condition. The measurement results are summarized in Table 1.

In order to calculate the plasma discharge efficiency, the amount of ozone generated under each condition was measured, and the amount of ozone generated relative to the power consumption was defined as the plasma discharge efficiency.

Figure 13:
FIG. 13 is a diagram illustrating results of Test Example 3.

In this test example, while the pulse width is changed and the frequency was fixed at 5 kHz, waveforms were measured. The measurement results are shown in FIG. 13. When the pulse width was 2 µs, plasma discharge did not occur. When the pulse width was 3 µs, plasma discharge weakly occurred. When the pulse width was 4 µs, plasma discharge sufficiently occurred.

TABLE 1

| Frequency (kHz) | Pulse width (µs) | A: Power consumption (kWh/m³) | B: Production of ozone (ppm) | Discharge efficiency (B/A) |
|---|---|---|---|---|
| 3 | 5 | 0.05 | — | — |
|  | 6 | 0.07 | — | — |
|  | 7 | 0.09 | — | — |
| 5 | 3 | 0.05 | 0.0005 | 0.01 |
|  | 4 | 0.07 | 0.0630 | 0.90 |
|  | 5 | 0.10 | 0.0650 | 0.65 |
| 7.5 | 2.5 | 0.06 | 0.0010 | 0.02 |
|  | 3 | 0.08 | 0.0425 | 0.53 |
|  | 4 | 0.12 | 0.0720 | 0.60 |

As shown in Table 1, it was found that power consumption and ozone production increase with increasing frequency and increasing pulse width.

However, it was found that plasma was not generated when the frequency was less than 3 kHz. In addition, it was found that the ozone generation efficiency per power consumption, that is, the plasma discharge efficiency decreases when the frequency was 7.5 kHz or more.

In addition, at a frequency of 5 kHz, a small amount of ozone was produced when the pulse width was 3 µs or less. On the other hand, when the pulse width was 6 µs or more, the power consumption was significantly higher than the amount of produced ozone. That is, the plasma discharge efficiency was low.

Therefore, to improve the discharge efficiency, that is, to increase the amount of plasma produced while reducing power consumption, the frequency of the pulsed waves applied to the plasma electrode module 50 is preferably in a range higher than 3 kHz and lower than 7.5 kHz, and the pulse width is preferably in a range longer than 3 seconds and shorter than 5 seconds.

Test Example 4

Among the components of the membrane separation pretreatment apparatus illustrated in FIG. 1, only the underwater plasma discharge unit 100 and the coagulant injector 300 were installed, and the coagulant was added in a concentration of 8 ppm. Under these conditions, the water treatment performance of the underwater plasma discharge unit 100 was evaluated.

In the test, the spacing between the holes 51 of the plasma electrode module 50 was fixed to 100 mm, and the diameter of the holes 51 was varied from 0.5 to 11 mm.

TABLE 2

|  | Hole diameter (mm) | Turbidity (NTU) | TSS (mg/L) |
|---|---|---|---|
| Comparative Example 1 | 0.5 | 1.87 | 6.1 |
| Example 1 | 1.5 | 0.92 | 3.2 |

TABLE 2-continued

| | Hole diameter (mm) | Turbidity (NTU) | TSS (mg/L) |
|---|---|---|---|
| Example 2 | 4.0 | 0.85 | 2.9 |
| Example 3 | 7.0 | 0.88 | 3.3 |
| Example 4 | 9.5 | 0.94 | 3.0 |
| Comparative Example 2 | 11 | 1.76 | 5.8 |

As shown in Table 2, Examples 1 to 4 show considerably lower turbidity and TSS concentration than Comparative Examples 1 and 2.

It is assumed that the effect was obtained because the diameter of the holes 51 was set to be in a range of 1 to 10 mm. This hole diameter range facilitates the adjustment of the size of the microbubbles and enables production of a sufficient number of microbubbles. From these test result, it is preferable that the diameter of the holes 51 ranges from 1 mm to 10 mm.

Test Example 5

The same membrane separation pretreatment apparatus as in Test Example 4 was installed and operated. However, in Test Example 5, the diameter of the holes 51 of the plasma electrode module 50 was fixedly set to 4 mm, and the interval between the holes 51 was changed in a range of from 80 mm to 130 mm.

TABLE 3

| | Hole interval (mm) | Turbidity (NTU) | TSS (mg/L) |
|---|---|---|---|
| Comparative Example 3 | 80 | 1.52 | 5.5 |
| Example 5 | 90 | 0.88 | 3.1 |
| Example 6 | 100 | 0.85 | 2.9 |
| Example 7 | 110 | 0.90 | 3.1 |
| Example 8 | 120 | 0.91 | 3.2 |
| Comparative Example 4 | 130 | 1.44 | 5.1 |

As shown in Table 3, Examples 5 to 8 are superior to Comparative Examples 3 and 4 in terms of turbidity and TSS. It is assumed that the effect is obtained because a larger hole interval in a range of 90 to 120 mm is favorable for generation and preservation of microbubbles.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A membrane separation pretreatment apparatus comprising:
   a membrane separation unit configured to remove particulate matter contained in raw water and thereby discharge filtered water in a filtration direction; and
   a first underwater plasma discharge unit disposed in front of the membrane separation unit and configured to cause a portion of the raw water to be introduced into the membrane separation unit to perform a first underwater plasma discharging,
   a second underwater plasma discharge unit disposed after the membrane separation unit to cause a portion of the filtered water to perform a second underwater plasma discharging and discharge plasma-processed backwash water; and
   a backwashing unit configured to supply the plasma-processed backwash water, discharged from the second underwater plasma discharge unit, as backwashing water to the membrane separation unit in an opposite direction of the filtration direction.

2. The apparatus according to claim 1, wherein the membrane separation unit comprises at least one filter selected from among an ultrafiltration (UF) filter and a dual media filtration (DMF) filter.

3. The apparatus according to claim 1, wherein the first underwater plasma discharge unit comprises:
   a reactor including an input port through which feed water flows in and an output port through which purified water flows out;
   a ground electrode disposed in a first side of the reactor; and
   a plasma electrode module disposed in a second side of the reactor and configured to generate plasma.

4. The apparatus according to claim 3, wherein electric power is applied to the plasma electrode module in a form of pulsed waves.

5. The apparatus according to claim 4, wherein the pulsed waves are at a frequency in a range higher than 3 kHz and lower than 7.5 kHz.

6. The apparatus according to claim 4, wherein the pulsed waves have a pulse width in a range longer than 3 seconds and shorter than 5 seconds.

7. The apparatus according to claim 4, wherein the input port, the output port, and the ground electrode are disposed at a same side of the reactor.

8. The apparatus according to claim 7, wherein the ground electrode and the plasma electrode module are disposed to face each other.

9. The apparatus according to claim 4, wherein the plasma electrode module comprises:
   a conductive substrate including a plurality of holes;
   a ceramic layer surrounding a portion of an outer surface of the conductive substrate; and
   plasma electrodes disposed in respective holes and having a multilayer structure in which a cylindrical ground portion, a fixed portion, and a discharge portion are sequentially stacked, wherein the ground portion is in contact with the conductive substrate and plasma is generated on the discharge portion.

10. The apparatus according to claim 9, wherein the conductive substrate has a plate shape or a cylinder shape.

11. The apparatus according to claim 9, wherein the ground portion, the fixed portion, and the discharge portion are integrally formed in a cylindrical structure and are made of a same material having corrosion resistance.

12. The apparatus according to claim 11, wherein the discharge portion disposed at a top has a smallest diameter and the ground portion disposed at a bottom has a largest diameter so that a diameter of the plasma electrode decreases toward the top.

13. The apparatus according to claim 1, further comprising a coagulant injector disposed between the first underwater plasma discharge unit and the membrane separation unit.

14. The apparatus according to claim 1, wherein the first underwater plasma discharge unit supplies gas generated through underwater discharging in a form of microbubbles to the membrane separation unit.

15. The apparatus according to claim 3, wherein the reactor further comprises a gap adjuster configured to adjust a gap between the ground electrode and the plasma electrode module.

16. The apparatus according to claim 15, wherein the gap adjuster is formed to face both surfaces of the reactor and is configured to increase or reduce a height of the reactor to adjust water storage capacity of the reactor and the gap between the ground electrode and the plasma electrode.

\* \* \* \* \*